United States Patent
Nayak et al.

(10) Patent No.: US 9,542,972 B1
(45) Date of Patent: Jan. 10, 2017

(54) SYSTEMS AND METHODS FOR MULTI-HEAD COEFFICIENT BASED SCALING

(71) Applicant: Avago Technologies General IP (Singapore) Pte. Ltd., Singapore (SG)

(72) Inventors: Aravind Ratnakar Nayak, Allentown, PA (US); Lu Lu, San Jose, CA (US); Richard Rauschmayer, Longmont, CO (US); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/938,892

(22) Filed: Nov. 12, 2015

(51) Int. Cl.
| | |
|---|---|
| *G11B 5/035* | (2006.01) |
| *G11B 20/10* | (2006.01) |
| *G06F 17/14* | (2006.01) |
| *G11B 5/09* | (2006.01) |

(52) U.S. Cl.
CPC ....... *G11B 20/10046* (2013.01); *G06F 17/142* (2013.01); *G11B 5/035* (2013.01); *G11B 5/09* (2013.01); *G11B 20/10009* (2013.01); *G11B 20/10055* (2013.01); *G11B 2220/90* (2013.01)

(58) Field of Classification Search
None
See application file for complete search history.

(56) References Cited

U.S. PATENT DOCUMENTS

| | | | | |
|---|---|---|---|---|
| 7,321,620 | B2 * | 1/2008 | Nakahira | H04L 25/03038 |
| | | | | 360/65 |
| 8,139,301 | B1 | 3/2012 | Li et al. | |
| 8,773,794 | B2 * | 7/2014 | Mathew | G11B 20/10046 |
| | | | | 360/45 |
| 8,804,260 | B2 * | 8/2014 | Mathew | G11B 20/10046 |
| | | | | 360/45 |
| 8,810,940 | B2 * | 8/2014 | Jin | G11B 5/012 |
| | | | | 360/25 |
| 8,837,068 | B1 | 9/2014 | Liao et al. | |
| 9,019,642 | B1 | 4/2015 | Xia et al. | |
| 9,147,416 | B2 * | 9/2015 | Grundvig | G11B 5/4886 |
| 9,245,580 | B1 * | 1/2016 | Lu | G11B 20/10046 |
| 9,286,915 | B1 * | 3/2016 | Dziak | G11B 5/012 |

* cited by examiner

*Primary Examiner* — Tan X Dinh

(57) ABSTRACT

Systems and method are disclosed relating generally to data processing, and more particularly to systems and methods for utilizing multiple data streams for data recovery from a storage device. One example of the system includes a first equalizer circuit, a second equalizer circuit, a summation circuit, a first multiplication circuit, a second multiplication circuit, and a scalar calculation circuit that is capable of calculating a scalar based upon coefficients that are also provided as inputs to the first equalizer and second equalizer.

20 Claims, 6 Drawing Sheets

SYSTEMS AND METHODS FOR MULTI-HEAD COEFFICIENT BASED SCALING

FIELD OF THE INVENTION

Systems and method relating generally to data processing, and more particularly to systems and methods for utilizing multiple data streams for data recovery from a storage device.

BACKGROUND

Traversing a storage medium using multiple read heads makes it easier to correctly access data from the storage medium. However, in some cases, misalignment of the read heads can introduce considerable interference from adjacent areas of the storage medium which in some cases may make the correctly accessing the data more difficult.

Hence, for at least the aforementioned reasons, there exists a need in the art for advanced systems and methods for processing data from a storage medium.

SUMMARY

Systems and method relating generally to data processing, and more particularly to systems and methods for utilizing multiple data streams for data recovery from a storage device.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and method relating generally to data processing, and more particularly to systems and methods for utilizing multiple data streams for data recovery from a storage device.

Figure 1:
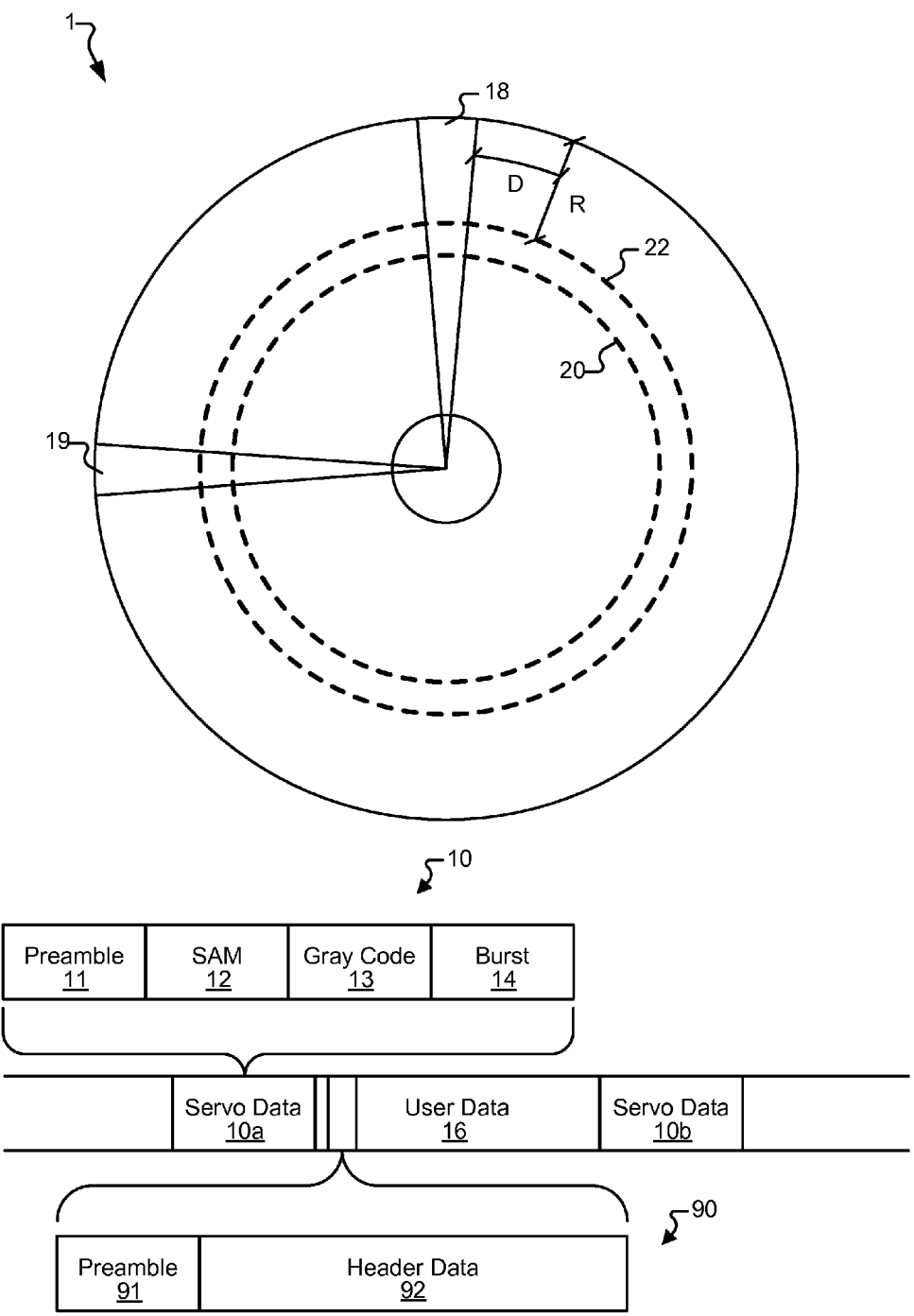
FIG. 1 is a block diagram of a known magnetic storage medium and sector data scheme.

Turning to FIG. 1, a storage medium 1 is shown with two exemplary tracks 20, 22 indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Various embodiments of the present invention provide data processing systems that include: a first equalizer circuit operable to equalize a first data input to yield a first equalized output; a first interpolator circuit operable to interpolate a delayed instance of the first data input to yield a first interpolated output; a second equalizer circuit operable to equalize a second data input to yield a second equalized output; a second interpolated circuit operable to interpolate a delayed instance of the second data input to yield a second interpolated output; a first summation circuit operable to sum the first equalized output and the second equalized output to yield a first combined output; a data detector circuit operable to apply a data detection algorithm to the first combined output to yield a detected output; a first loop pulse estimator circuit operable to estimate a first pulse output from the detected output; a second loop pulse estimator circuit operable to estimate a second pulse output from the detected output; a first multiplier operable to multiply a first interim feedback by a first scalar value to yield a first scaled output, where the first interim feedback is derived from the first pulse output; a second multiplier operable to multiply a second interim feedback by a second scalar value to yield a second scaled output, where the second interim feedback is derived from the second pulse output; and a second summation circuit operable to sum a third interim feedback with a fourth interim feedback to yield a second combined output, where the third interim feedback is derived from the first interim feedback and the fourth interim feedback is derived from the second interim feedback. in some cases, the systems are implemented as part of an integrated circuit.

In some instances of the aforementioned embodiments, The systems further include: a first slope circuit operable to calculate a first slope based upon the first pulse output, where the first interim feedback is the first slope; and a second slope circuit operable to calculate a second slope based upon the second pulse output, where the second interim feedback is the second slope. In various instances of the aforementioned embodiments, the first interim feedback is the first pulse output, and the second interim feedback is the second pulse output. In some such instances, the systems further include: a first slope circuit operable to calculate a first slope based upon the first scaled output, where the third interim feedback is the first slope; and a second slope circuit operable to calculate a second slope based upon the second scaled output, where the fourth interim feedback is the second slope.

In various instances of the aforementioned embodiments, the third interim feedback is the first scaled output, and the fourth interim feedback is the second scaled output. In particular instances of the aforementioned embodiments, the systems are implemented as part of a storage device. In such instances, the systems further include: a storage medium; a head disposed in relation to the storage medium, wherein the head includes at least a first read sensor and a second read sensor; a first analog to digital converter circuit operable to convert a first analog input derived from the first read sensor to yield a first series of digital samples based upon a feedback value, where the feedback value is generated based upon the second combined output, and where the first data input is derived from the first series of digital samples; and a second analog to digital converter circuit operable to convert a second analog input derived from the second read sensor to yield a second series of digital samples based upon the feedback value, where the second data input is derived from the second series of digital samples.

In one or more instances of the aforementioned embodiments, operation of the first equalizer circuit is governed in part based upon a first coefficient, the second equalizer circuit is governed in part based upon a second coefficient, and the systems further include a scalar calculation circuit operable to: calculate the first scalar based upon the first coefficient and the second coefficient; and calculate the second scalar based upon the first scalar. In various instances of the aforementioned embodiments, the systems further include a calar calculation circuit operable to: calculate a mean squared error of the first equalized output to yield a first error; calculate a mean squared error of the second equalized output to yield a second error; calculate the first scalar based upon the first error and the second error; and calculate the second scalar based upon the first scalar. In one or more instances of the aforementioned embodiments, operation of the first equalizer circuit is governed in part based upon a first coefficient, the second equalizer circuit is governed in part based upon a second coefficient, and the systems further include a scalar calculation circuit operable to: calculate a first fast Fourier transform value based at least in part on the first coefficient; calculate a second fast Fourier transform value based at least in part on the second coefficient; calculate the first scalar based upon a combination of the first fast Fourier transform value and the second first fast Fourier transform value. In yet other instances of the aforementioned embodiments, operation of the first equalizer circuit is governed in part based upon a first coefficient and a second coefficient, where the second equalizer circuit is governed in part based upon a third coefficient and a fourth coefficient, the systems further include a scalar calculation circuit. The scalar calculation circuit is operable to: calculate a first sine value based at least in part on the first coefficient; calculate a first cosine value based at least in part on the second coefficient; calculate a second sine value based at least in part on the third coefficient; calculate a second cosine value based at least in part on the fourth coefficient; calculate a first magnitude value based on the first sine value and a first cosine value; calculate a second magnitude value based on the second sine value and a second cosine value; and calculate the first scalar based upon a combination of the first magnitude value and the second magnitude value.

Other embodiments provide data processing systems that include: a first equalizer circuit operable to equalize a first data input to yield a first equalized output based upon at least in part on a first coefficient; a second equalizer circuit operable to equalize a second data input to yield a second equalized output based upon at least in part on a second coefficient; a summation circuit operable to sum the first equalized output with the second equalized output to yield a composite output; a first multiplication circuit operable to multiply an first input by a first scalar value to yield a first product, where the first input is derived from a combination of the composite output and the first data input; a second multiplication circuit operable to multiply a second input by a second scalar value to yield a second product, where the second input is derived from a combination of the composite output and the second data input; and a scalar calculation circuit operable to calculate the first scalar based upon the first coefficient and the second coefficient.

In some instances of the aforementioned embodiments, the scalar calculation circuit is further operable to calculate the second scalar based upon the first scalar. In various instances of the aforementioned embodiments, the system is implemented as part of an integrated circuit. In some instances of the aforementioned embodiments, the system is implemented as part of a storage device. The storage device includes: a storage medium; a head disposed in relation to the storage medium, wherein the head includes at least a first read sensor and a second read sensor; a first analog to digital converter circuit operable to convert a first analog input derived from the first read sensor to yield a first series of digital samples based upon a feedback value, where the feedback value is generated based upon a combination of the first product and the second product, and where the first data input is derived from the first series of digital samples; and a second analog to digital converter circuit operable to convert a second analog input derived from the second read sensor to yield a second series of digital samples based upon the feedback value, where the second data input is derived from the second series of digital samples.

In some instances of the aforementioned embodiments, the scalar calculation circuit is operable to: calculate a first fast Fourier transform value based at least in part on the first coefficient; calculate a second fast Fourier transform value based at least in part on the second coefficient; calculate the first scalar based upon a combination of the first fast Fourier transform value and the second first fast Fourier transform value. In other instances, operation of the first equalizer circuit is governed in part based upon the first coefficient and a third coefficient, and the second equalizer circuit is governed in part based upon the second coefficient and a fourth coefficient, and the scalar calculation circuit is operable to: calculate a first sine value based at least in part on the first coefficient; calculate a first cosine value based at least in part on the third coefficient; calculate a second sine value based at least in part on the second coefficient; calculate a second cosine value based at least in part on the fourth coefficient; calculate a first magnitude value based on the first sine value and a first cosine value; calculate a second magnitude value based on the second sine value and a second cosine value; and calculate the first scalar based upon a combination of the first magnitude value and the second magnitude value.

Yet other embodiments provide processing systems that include: a first equalizer circuit operable to equalize a first data input to yield a first equalized output; a second equalizer circuit operable to equalize a second data input to yield a second equalized output; a summation circuit operable to sum the first equalized output with the second equalized output to yield a composite output; a first multiplication circuit operable to multiply an first input by a first scalar value to yield a first product, where the first input is derived from a combination of the composite output and the first data input; a second multiplication circuit operable to multiply a second input by a second scalar value to yield a second product, where the second input is derived from a combination of the composite output and the second data input; and a scalar calculation circuit. The scalar calculation circuit is operable to: calculate a mean squared error of the first equalized output to yield a first error; calculate a mean squared error of the second equalized output to yield a second error; and calculate the first scalar based upon the first error and the second error.

Figure 2:
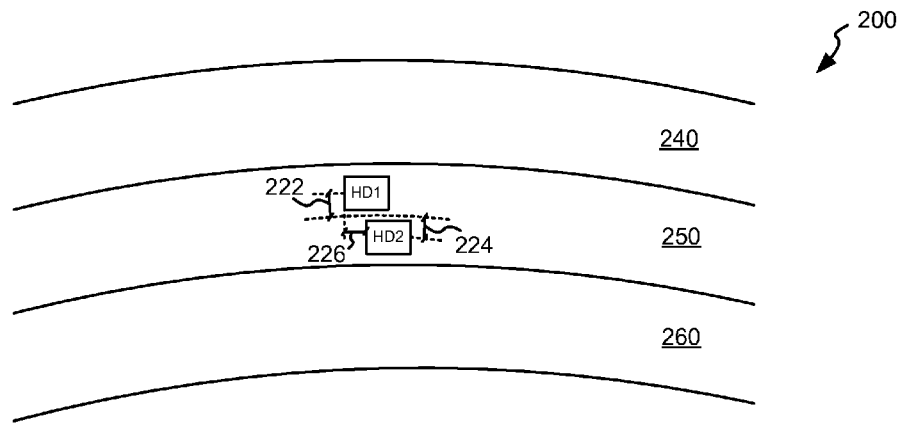
FIG. 2 is a diagram showing multiple tracks of a storage medium traversed by two read heads.

Turning to FIG. 2, a diagram 200 shows three tracks 240, 250, 260 on a storage medium. Also shown are two read heads HD1, HD2 traversing track 250, and thereby sensing information previously stored on track 250. Read head HD1 is displaced from the center of track 250 by a lateral distance 222, and read head HD2 is displaced from the center of track 250 by a lateral distance 224. In addition, read head HD2 lags read head HD1 by an inline distance 226. In some cases, the distances of one read head relative to the other read head are substantially fixed as both heads are fixed to the same read/write head assembly. Where lateral distance 222 increases and lateral distance 224 decreases, read head HD1 will start to experience greater interference from the data stored on track 240 and thereby exhibit reduced signal to noise ratio. Conversely, where lateral distance 224 increases and lateral distance 222 decreases, read head HD2 will start to experience greater interference from the data stored on track 260 and thereby exhibit reduced signal to noise ratio. This interference from adjacent tracks decreases the quality of the signal provided from the read head experiencing the interference (i.e., the signal of track 250 relative to the signal from an adjacent track decreases).

Figure 3:
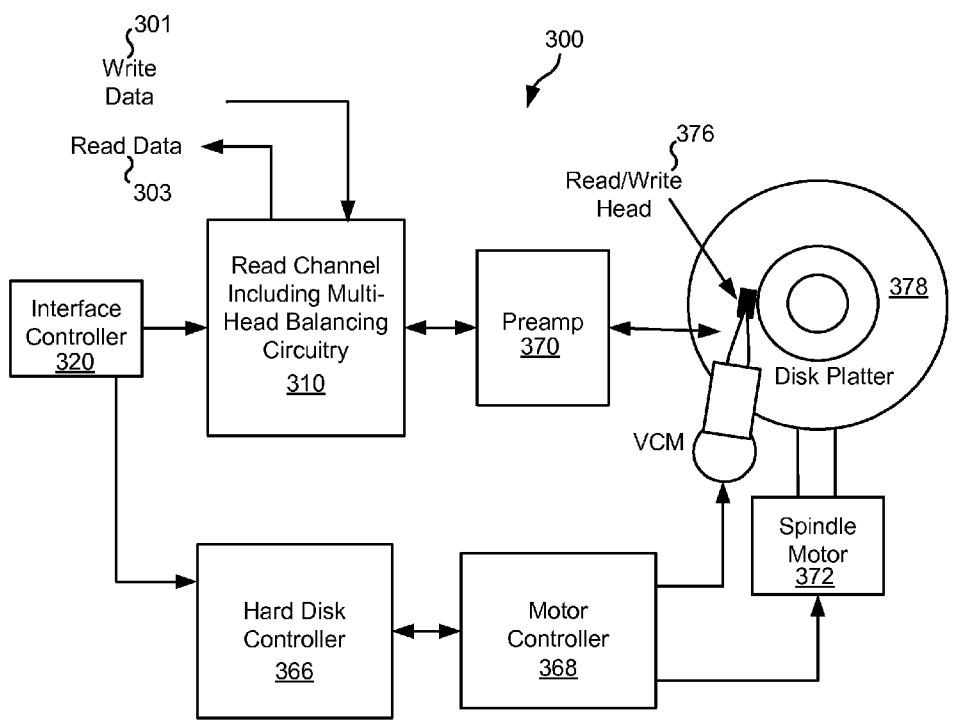
FIG. 3 shows a storage system that includes a read channel having multi-head balancing circuitry in accordance with one or more embodiments.

Turning to FIG. 3, a storage system 300 is shown that includes a read channel 310 having multi-head balancing circuitry in accordance with one or more embodiments of the present invention. Storage system 300 may be, for example, a hard disk drive. Storage system 300 also includes a preamplifier 370, an interface controller 320, a hard disk controller 366, a motor controller 368, a spindle motor 372, a disk platter 378, and a read/write head 376. Read/write head 376 includes multiple individual read heads each sensing data on a given track of disk platter 378. Interface controller 320 controls addressing and timing of data to/from disk platter 378, and interacts with a host controller (not shown). The data on disk platter 378 consists of groups of magnetic signals that may be detected by read/write head assembly 376 when the assembly is properly positioned over disk platter 378. In one embodiment, disk platter 378 includes magnetic signals recorded in accordance with either a longitudinal or a perpendicular recording scheme.

In a typical read operation, read/write head 376 is accurately positioned by motor controller 368 over a desired data track on disk platter 378. Motor controller 368 both positions read/write head 376 in relation to disk platter 378 and drives spindle motor 372 by moving read/write head assembly 376 to the proper data track on disk platter 378 under the direction of hard disk controller 366. Spindle motor 372 spins disk platter 378 at a determined spin rate (RPMs). Once read/write head 376 is positioned adjacent the proper data track, magnetic signals representing data on disk platter 378 are sensed by read/write head 376 as disk platter 378 is rotated by spindle motor 372. The sensed magnetic signals are provided as a continuous, minute analog signal representative of the magnetic data on disk platter 378. This minute analog signal is transferred from read/write head 376 to read channel circuit 310 via preamplifier 370. Preamplifier 370 is operable to amplify the minute analog signals accessed from disk platter 378. In turn, read channel circuit 310 decodes and digitizes the received analog signal to recreate the information originally written to disk platter 378. This data is provided as read data 303 to a receiving circuit. A write operation is substantially the opposite of the preceding read operation with write data 301 being provided to read channel circuit 310. This data is then encoded and written to disk platter 378.

The data streams developed from each of the read heads of read/write head 376 are compared to yield a composite read data stream which is then processed. The combination of the data streams from the respective heads is based upon a balancing of the data from each of the heads, with the balancing being performed based upon a combination of adjustable scalar and coefficient values. A data processing circuit similar to that discussed below in relation to one of FIGS. 4-5 may be included in read channel 310 to perform the combining of signals from the respective read heads. Further, the processing may be performed similar to that discussed below in relation to FIG. 10.

It should be noted that storage system 300 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 300, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 310 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 300 may be modified to include solid state memory that is used to store data in addition to the storage offered by disk platter 378. This solid state memory may be used in parallel to disk platter 378 to provide additional storage. In such a case, the solid state memory receives and provides information directly to read channel circuit 310. Alternatively, the solid state memory may be used as a cache where it offers faster access time than that offered by disk platted 378. In such a case, the solid state memory may be disposed between interface controller 320 and read channel circuit 310 where it operates as a pass through to disk platter 378 when requested data is not available in the solid state memory or when the solid state memory does not have sufficient storage to hold a newly written data set. Based upon the disclosure provided herein, one of ordinary skill in the art will recognize a variety of storage systems including both disk platter 378 and a solid state memory.

Figure 4:
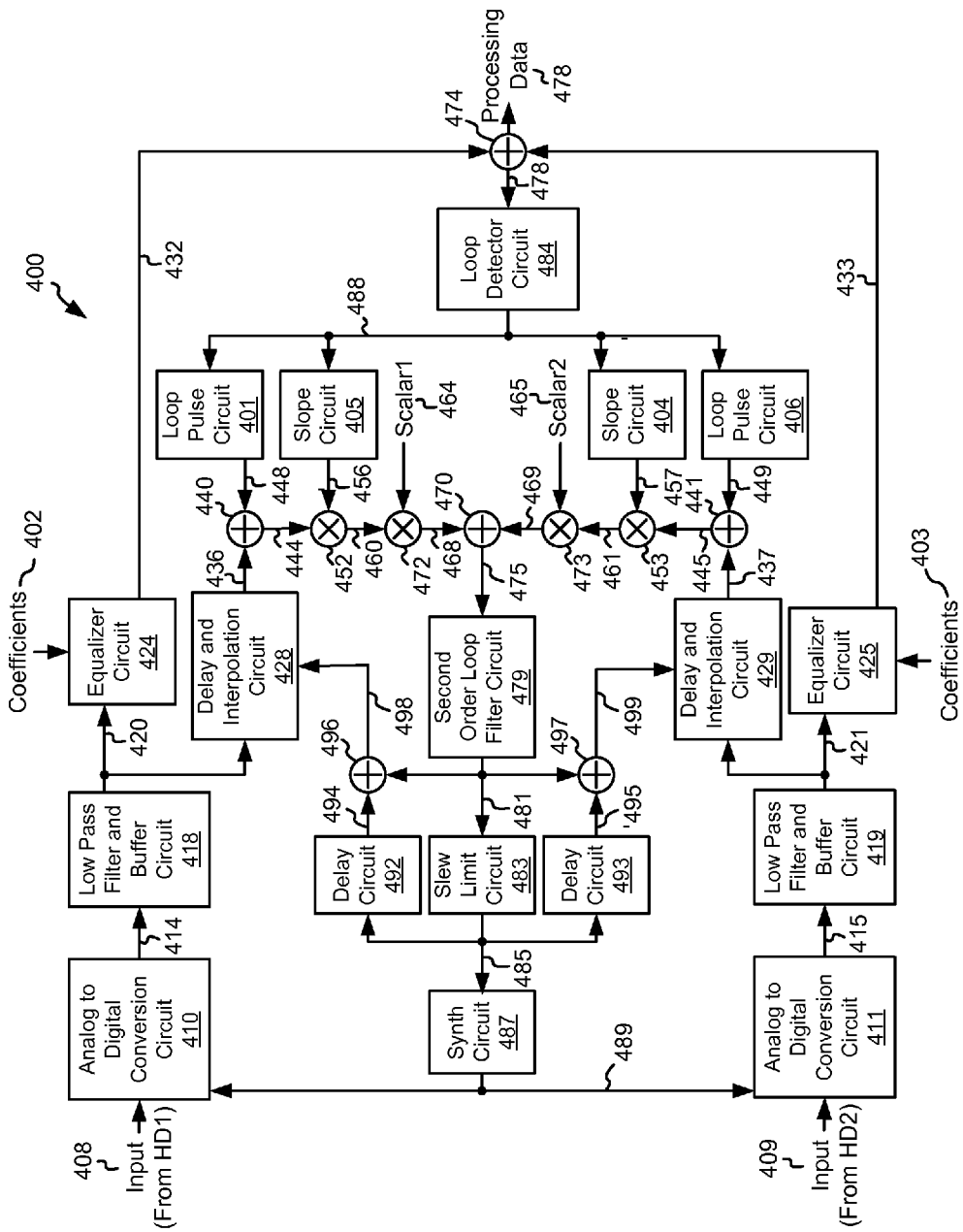
FIG. 4 shows a processing circuit able to balance data received from two distinct read heads to yield a composite processing output in accordance with some embodiments.

Turning to FIG. 4, a processing circuit 400 able to balance data received as inputs 408, 409 from two distinct read heads (not shown) to yield a composite processing data output 478 is shown in accordance with some embodiments. Inputs 408, 409 may be derived from respective read heads disposed in relation to a storage medium. Based upon the disclosure provided herein, one of ordinary skill in the art will recognize a variety of sources from which inputs 408, 409 may be derived.

Processing circuit 400 includes an analog to digital conversion circuit 410 that converts input 408 into a series of digital samples 414 synchronous to a sample clock 489. Digital samples 414 are provided to a low pass filter and buffer circuit 418 where a digital low pass filtering algorithm is applied to the digital samples to yield filtered samples which are then stored to a buffer as buffered samples 420. Buffered samples 420 are provided to an equalizer circuit 424 where they are equalized to yield an equalized output 432. The equalization is governed at least in part by one or more coefficients 402. In one particular embodiment, equalization circuit 424 is a digital finite impulse response filter circuit. Based upon the disclosure provided herein, one of ordinary skill in the art will recognize other types of equalization circuits that may be used in relation to other embodiments.

Additionally, processing circuit 400 includes an analog to digital conversion circuit 411 that converts input 409 into a series of digital samples 415 synchronous to sample clock 489. Digital samples 415 are provided to a low pass filter and buffer circuit 419 where a digital low pass filtering algorithm is applied to the digital samples to yield filtered samples which are then stored to a buffer as buffered samples 421. Buffered samples 421 are provided to an equalizer circuit 425 where they are equalized to yield an equalized output 433. The equalization is governed at least in part by one or more coefficients 403. In one particular embodiment, equalization circuit 425 is a digital finite impulse response filter circuit. Based upon the disclosure provided herein, one of ordinary skill in the art will recognize other types of equalization circuits that may be used in relation to other embodiments.

Equalized output 433 and equalized output 432 are added together using a summation circuit 474 to yield processing data output 478. Processing data output 478 is also provided to a loop detector circuit 484 that applies a data detection algorithm to processing data output 478 to yield a detected output 488. In one particular embodiment, the data detection algorithm is a maximum a posteriori algorithm. In another particular embodiment, the data detection algorithm is a Viterbi algorithm. Based upon the disclosure provided herein, one of ordinary skill in the art will recognize other data detection algorithms that may be used in relation to other embodiments.

Detected output 488 is provided to a loop pulse circuit 401 that estimates the pulse shape at low pass filter and buffer circuit 418 to yield a pulse output 448. In parallel, a slope circuit 405 calculates a slope of detected output 488 to yield a slope output 456. A delay and interpolation circuit 428 delays and interpolates buffered samples 420 to yield an aligned sample set 436 based upon a sample offset input 498. The delay and interpolation applied by delay and interpolation circuit 428 is designed to align buffered samples 420 with pulse output 448 derived from buffered samples 420. Similarly, detected output 488 is provided to a loop pulse circuit 406 that estimates the pulse shape at low pass filter and buffer circuit 419 to yield a pulse output 449. In parallel, a slope circuit 404 calculates a slope of detected output 488 to yield a slope output 457. A delay and interpolation circuit 429 delays and interpolates buffered samples 421 to yield an aligned sample set 437 based upon a sample offset input 499. The delay and interpolation applied by delay and interpolation circuit 429 is designed to align buffered samples 421 with pulse output 449 derived from buffered samples 421.

A summation circuit 440 subtracts pulse output 448 from aligned sample set 436 to yield a difference 444, and a multiplication circuit 452 multiplies difference 444 by slope output 456 to yield a product 460. Product 460 is provided to a multiplication circuit 472 where it is multiplied by a first scalar 464 to yield a product 468. Similarly, a summation circuit 441 subtracts pulse output 449 from aligned sample set 437 to yield a difference 445, and a multiplication circuit 453 multiplies difference 445 by slope output 457 to yield a product 461. Product 461 is provided to a multiplication circuit 473 where it is multiplied by a second scalar 465 to yield a product 469.

A summation circuit 470 adds product 468 to product 469 to yield a composite output 475. Composite output 475 is provided to a second order filter circuit 479. Second order filter circuit 479 applies a second order filtering algorithm to composite output 475 to yield a filtered output 481. A slew limiting circuit 483 slew limits filtered output 481 to yield a slewed output 485. A delay circuit 492 delays slewed output 485 to yield a delayed output 494, and a summation circuit 496 subtracts delayed output 494 from filtered output 481 to yield sample offset input 498. Similarly, a delay circuit 493 delays slewed output 485 to yield a delayed output 495, and a summation circuit 497 subtracts delayed output 495 from filtered output 481 to yield sample offset input 499. Slewed output 485 is provided to a clock synthesizer circuit 487 that adjusts sample clock 489.

Figure 6:
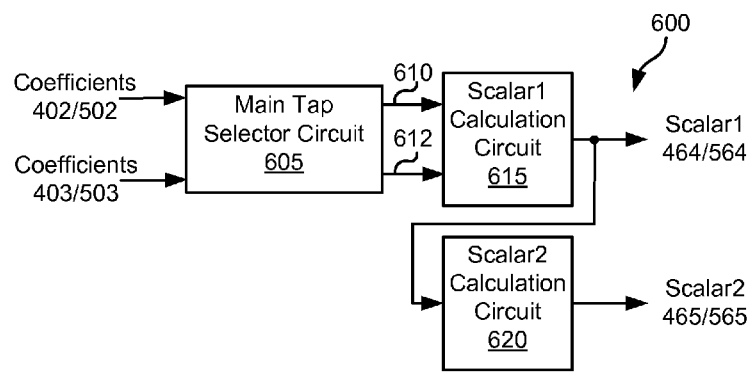
FIGS. 6-9 show scalar calculation circuits that may be used in relation to the processing circuits of FIGS. 4-5 in accordance with different embodiments of the present invention.

Balancing the weight of input 408 and the weight of input 409 represented in processing data output 478 is based upon a combination of first scalar 464, second scalar 465, coefficients 402, and coefficients 403. Coefficients 402 and coefficients 403 may be adapted using any coefficient adaptation approach known in the art, and in some cases, first scalar 464 and second scalar 465 are calculated as a function of the adapted coefficients. Turning to FIG. 6, A scalar calculation circuit 600 that may be used in relation to the processing circuit 400 is shown in accordance with some embodiments. As shown, scalar calculation circuit 600 includes a main tap selector circuit 605 that selects the one of coefficients 402 (i.e., coefficients governing the operation of equalizer circuit 424) that has the highest value, and one of the coefficients 403 (i.e., coefficients governing the operation of equalizer circuit 425) that has the highest value. The value of the main tap from coefficients 402 is provided as a coefficient value 610 and the value of the main tap from coefficients 403 is provided as a coefficient value 612. Both coefficient value 610 and coefficient value 612 are provided to a scalar1 calculation circuit 615. Scalar1 calculation circuit 615 calculates first scalar 464 in accordance with the following equation:

$$\text{First Scalar } 464 = \text{round}\left[\frac{(16 * \text{Coefficient Value } 610)}{(\text{Coefficient Value } 610 + \text{Coefficient Value } 612)}\right],$$

were the "round" function rounds the value to the nearest integer. First scalar 464 is provided to a scalar2 calculation circuit 620 that calculates second scalar 465 in accordance with the following equation:

Second Scalar 465=16−First Scalar 464.

Figure 7:
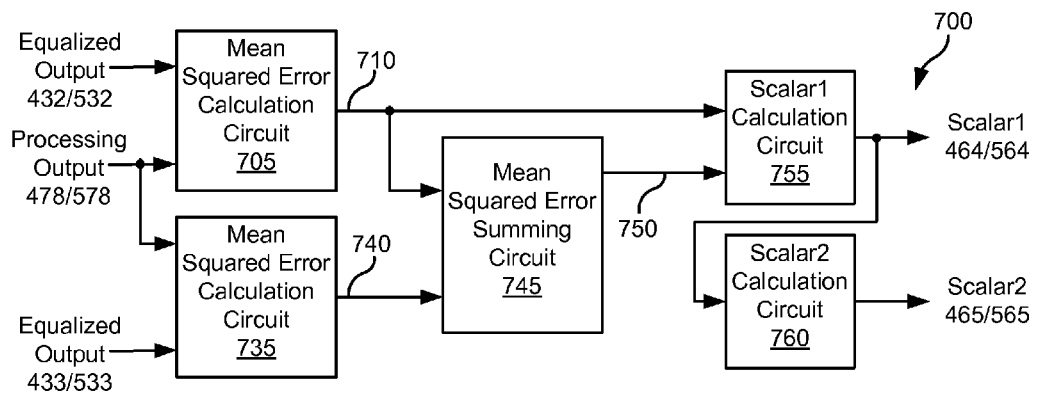

Turning to FIG. 7, another scalar calculation circuit 700 that may be used in relation to the processing circuit 400 is shown in accordance with other embodiments. As shown, scalar calculation circuit 700 includes a mean squared error calculation circuit 705 that receives equalized output 432 and processing data output 478, and calculates a mean squared error of equalized output 432 compared with processing data output 478 (i.e., the combination of equalized output 432 and equalized output 433). The resulting mean squared error value is inverted (i.e., 1/MSE) with the result being provided as an MSE value 710. Additionally, scalar calculation circuit 700 includes a mean squared error calculation circuit 735 that receives equalized output 433 and processing data output 478, and calculates a mean squared error of equalized output 433 compared with processing data output 478 (i.e., the combination of equalized output 432 and equalized output 433). The resulting mean squared error value is inverted (i.e., 1/MSE) with the result being provided as an MSE value 740. A mean squared error summing circuit 745 adds MSE value 710 and MSE value 740 to yield a sum of the mean squared error values (i.e., MSE value 710+MSE value 740) which is provided as a summed MSE output 750.

Both MSE value 710 and summed MSE output 750 are provided to a scalar1 calculation circuit 755. Scalar1 calculation circuit 755 calculates first scalar 464 in accordance with the following equation:

$$\text{First Scalar } 464 = \text{round}\left[\frac{(16 * \text{MSE Value } 710)}{\text{Summed MSE Value } 750}\right],$$

were the "round" function rounds the value to the nearest integer. First scalar 464 is provided to a scalar2 calculation circuit 760 that calculates second scalar 465 in accordance with the following equation:

Second Scalar 465=16−First Scalar 464.

Figure 8:
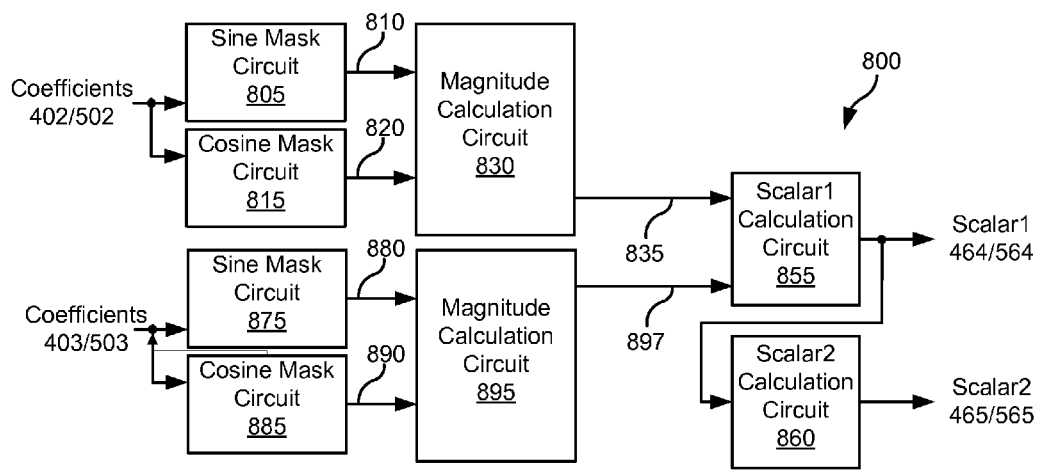

Turning to FIG. 8, yet another scalar calculation circuit 800 that may be used in relation to the processing circuit 400 is shown in accordance with other embodiments. As shown, scalar calculation circuit 800 includes a sine mask circuit 805 that receives coefficients 402 (i.e., coefficients governing the operation of equalizer circuit 424 [$f0_0, f0_1, \ldots, f0_N$]) and masks them with a sine mask [0 1 0 −1 0 1 0 −1 . . . ] to yield a sine output 810 (i.e., [$f0_1−f0_3+f0_5−f0_7+\ldots$]). A cosine mask circuit 815 that receives coefficients 402 [$f0_0, f0_1, \ldots, f0_N$] and masks them with a cosine mask [01 0 −1 0 1 0 −1 0 . . . ] to yield a cosine output 820 (i.e., [$f0_0−f0_2+f0_4−f0_6+\ldots$]). Sine output 810 and cosine output 820 are provided to a magnitude calculation circuit 830 that calculates a magnitude 835 in accordance with the following equation:

Magnitude 835=(sine output 810)$^2$+(cosine output 820)$^2$.

Additionally, scalar calculation circuit 800 includes a sine mask circuit 875 that receives coefficients 403 (i.e., coefficients governing the operation of equalizer circuit 425 [$f1_0, f1_1, \ldots, f1_N$]) and masks them with a sine mask [0 1 0 −1 0 1 0 −1 . . . ] to yield a sine output 880 (i.e., [$f1_1−f1_3+f1_5−f1_7+\ldots$]). A cosine mask circuit 885 that receives coefficients 403 [$f1_0, f1_1, \ldots, f1_N$] and masks them with a cosine mask [01 0 −1 0 1 0 −1 0 . . . ] to yield a cosine output 890 (i.e., [$f1_0−f1_2+f1_4−f1_6+\ldots$]). Sine output 880 and cosine output 890 are provided to a magnitude calculation circuit 895 that calculates a magnitude 897 in accordance with the following equation:

Magnitude 897=(sine output 880)$^2$+(cosine output 890)$^2$.

Magnitude 835 and magnitude 897 are provided to a scalar1 calculation circuit 855. Scalar1 calculation circuit 855 calculates first scalar 464 in accordance with the following equation:

$$\text{First Scalar } 464 = \text{round}\left[\frac{(16 * \text{Magnitude } 835)}{\text{Magnitude } 835 + \text{Magnitude } 897}\right],$$

were the "round" function rounds the value to the nearest integer. First scalar 464 is provided to a scalar2 calculation circuit 960 that calculates second scalar 465 in accordance with the following equation:

Second Scalar 465=16−First Scalar 464.

Figure 9:
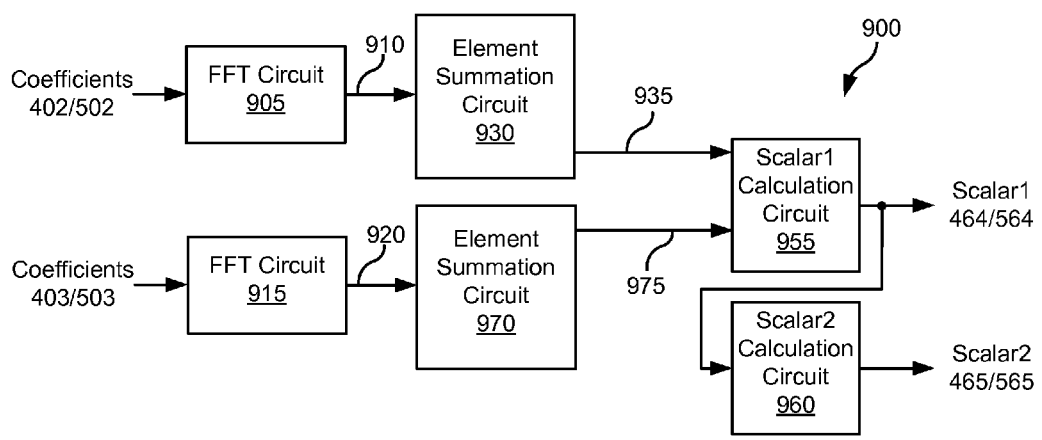

Turning to FIG. 9, yet another scalar calculation circuit 900 that may be used in relation to the processing circuit 400 is shown in accordance with other embodiments. As shown, scalar calculation circuit 900 includes a fast Fourier transform (FFT) circuit 905 that applies a fast Fourier transform to coefficients 402 to calculate the fast Fourier transform values at frequency/4 and frequency/8 that are provided as frequency values 910 to an element summation circuit 930. The aforementioned "frequency" is the data rate at which the system is operating. Element summation circuit 930 sums the received values to yield an FFT value 935 for coefficients 402. In parallel, a fast Fourier transform (FFT) circuit 915 that applies a fast Fourier transform to coefficients 403 to calculate the fast Fourier transform values at frequency/4 and frequency/8 that are provided as frequency values 920 to an element summation circuit 970. Notably, other embodiments may calculate several FFT values corresponding to frequencies between frequency/4 and frequency/8 to get a more accurate representation of the frequency response in the area of interest. Element summation circuit 970 sums the received values to yield an FFT value 975 for coefficients 403.

FFT value 935 and FFT value 975 are provided to a scalar1 calculation circuit 955. Scalar1 calculation circuit 955 calculates first scalar 464 in accordance with the following equation:

$$\text{First Scalar 464} = \text{round}\left[\frac{(16*FTT\text{ Value 935})}{FTT\text{ Value 935} + FFT\text{ Value 975}}\right],$$

were the "round" function rounds the value to the nearest integer. First scalar 464 is provided to a scalar2 calculation circuit 860 that calculates second scalar 465 in accordance with the following equation:

Second Scalar 465=16−First Scalar 464.

Figure 5:
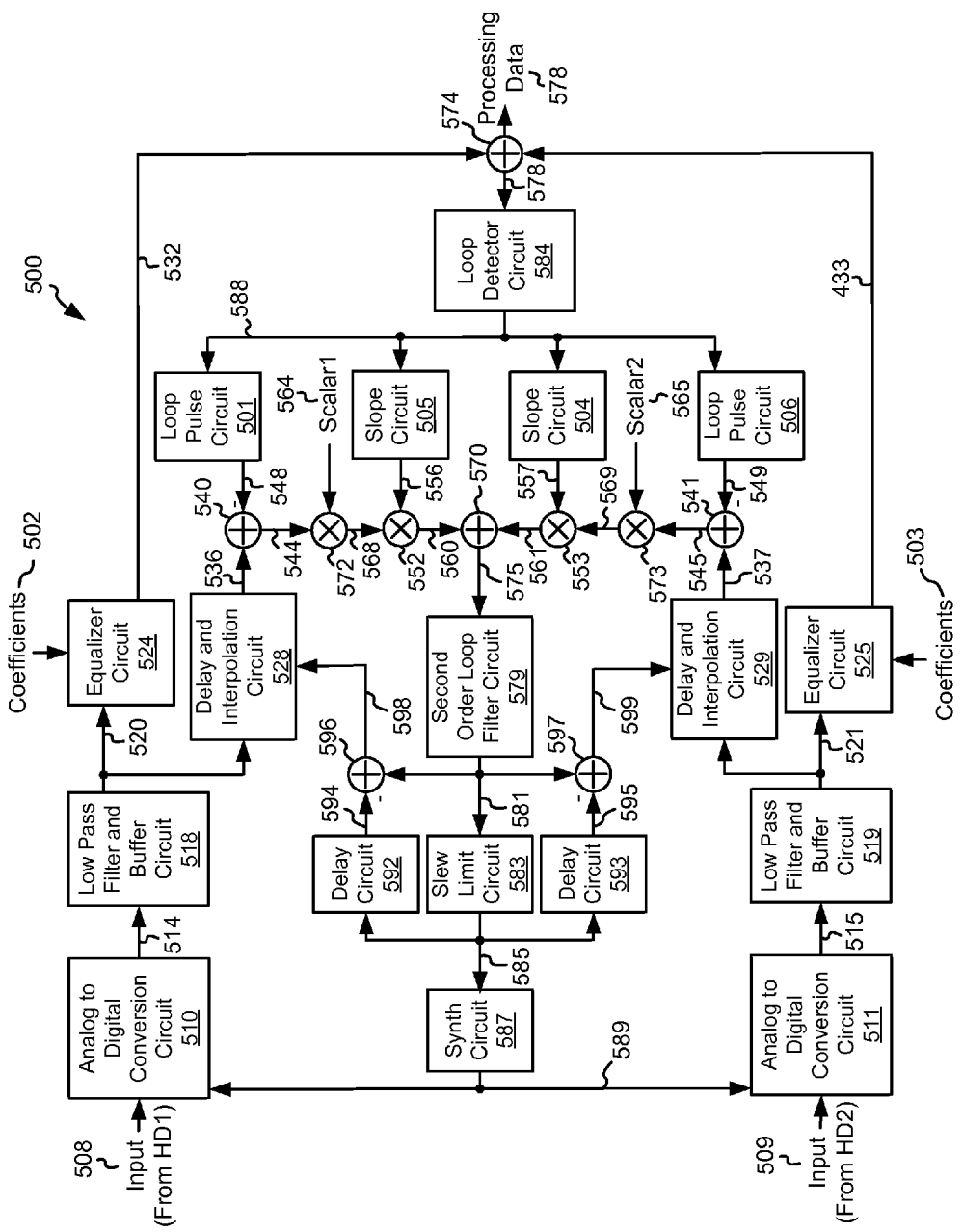
FIG. 5 shows another processing circuit able to balance data received from two distinct read heads to yield a composite processing output in accordance with other embodiments.

Turning to FIG. 5, another processing circuit 500 able to balance data received as inputs 508, 509 from two distinct read heads (not shown) to yield a composite processing data output 578 is shown in accordance with other embodiments. Inputs 508, 509 may be derived from respective read heads disposed in relation to a storage medium. Based upon the disclosure provided herein, one of ordinary skill in the art will recognize a variety of sources from which inputs 508, 509 may be derived.

Processing circuit 500 includes an analog to digital conversion circuit 510 that converts input 508 into a series of digital samples 514 synchronous to a sample clock 589. Digital samples 514 are provided to a low pass filter and buffer circuit 518 where a digital low pass filtering algorithm is applied to the digital samples to yield filtered samples which are then stored to a buffer as buffered samples 520. Buffered samples 520 are provided to an equalizer circuit 524 where they are equalized to yield an equalized output 532. The equalization is governed at least in part by one or more coefficients 502. In one particular embodiment, equalization circuit 524 is a digital finite impulse response filter circuit. Based upon the disclosure provided herein, one of ordinary skill in the art will recognize other types of equalization circuits that may be used in relation to other embodiments.

Additionally, processing circuit 500 includes an analog to digital conversion circuit 511 that converts input 509 into a series of digital samples 515 synchronous to sample clock 589. Digital samples 515 are provided to a low pass filter and buffer circuit 519 where a digital low pass filtering algorithm is applied to the digital samples to yield filtered samples which are then stored to a buffer as buffered samples 521. Buffered samples 521 are provided to an equalizer circuit 525 where they are equalized to yield an equalized output 533. The equalization is governed at least in part by one or more coefficients 503. In one particular embodiment, equalization circuit 525 is a digital finite impulse response filter circuit. Based upon the disclosure provided herein, one of ordinary skill in the art will recognize other types of equalization circuits that may be used in relation to other embodiments.

Equalized output 533 and equalized output 532 are added together using a summation circuit 574 to yield processing data output 578. Processing data output 578 is also provided to a loop detector circuit 584 that applies a data detection algorithm to processing data output 578 to yield a detected output 588. In one particular embodiment, the data detection algorithm is a maximum a posteriori algorithm. In another particular embodiment, the data detection algorithm is a Viterbi algorithm. Based upon the disclosure provided herein, one of ordinary skill in the art will recognize other data detection algorithms that may be used in relation to other embodiments.

Detected output 588 is provided to a loop pulse circuit 501 that estimates the pulse shape at low pass filter and buffer circuit 518 to yield a pulse output 548. In parallel, a slope circuit 505 calculates a slope of detected output 588 to yield a slope output 556. A delay and interpolation circuit 528 delays and interpolates buffered samples 520 to yield an aligned sample set 536 based upon a sample offset input 598. The delay and interpolation applied by delay and interpolation circuit 528 is designed to align buffered samples 520 with pulse output 548 derived from buffered samples 520. Similarly, detected output 588 is provided to a loop pulse circuit 506 that estimates the pulse shape at low pass filter and buffer circuit 519 to yield a pulse output 549. In parallel, a slope circuit 504 calculates a slope of detected output 588 to yield a slope output 557. A delay and interpolation circuit 529 delays and interpolates buffered samples 521 to yield an aligned sample set 537 based upon a sample offset input 599. The delay and interpolation applied by delay and interpolation circuit 529 is designed to align buffered samples 521 with pulse output 549 derived from buffered samples 521.

A summation circuit 540 subtracts pulse output 548 from aligned sample set 536 to yield a difference 544, and a multiplication circuit 572 multiplies difference 544 by a first scalar 564 to yield a product 568. Product 568 is provided to a multiplier circuit 552 where it is multiplied by slope output 556 to yield a product 560. Similarly, a summation circuit 541 subtracts pulse output 549 from aligned sample set 537 to yield a difference 545, and a multiplication circuit 573 multiplies difference 545 by scalar2 565 to yield a product 569. Product 569 is provided to a multiplier circuit 553 where it is multiplied by slope output 557 to yield a product 561.

A summation circuit 570 adds product 560 to product 561 to yield a composite output 575. Composite output 575 is provided to a second order filter circuit 579. Second order filter circuit 579 applies a second order filtering algorithm to composite output 575 to yield a filtered output 581. A slew limiting circuit 583 slew limits filtered output 581 to yield a slewed output 585. A delay circuit 592 delays slewed output 585 to yield a delayed output 594, and a summation circuit 596 subtracts delayed output 594 from filtered output 581 to yield sample offset input 598. Similarly, a delay circuit 593 delays slewed output 585 to yield a delayed output 595, and a summation circuit 597 subtracts delayed output 595 from filtered output 581 to yield sample offset input 599. Slewed output 585 is provided to a clock synthesizer circuit 587 that adjusts sample clock 589.

Balancing the weight of input 508 and the weight of input 509 represented in processing data output 578 is based upon a combination of first scalar 564, second scalar 565, coefficients 502, and coefficients 503. Coefficients 502 and coefficients 503 may be adapted using any coefficient adaptation approach known in the art, and in some cases, first scalar 564 and second scalar 565 are calculated as a function of the adapted coefficients. Turning to FIG. 6, A scalar calculation circuit 600 that may be used in relation to the processing circuit 500 is shown in accordance with some embodiments. As shown, scalar calculation circuit 600 includes a main tap selector circuit 605 that selects the one of coefficients 502 (i.e., coefficients governing the operation of equalizer circuit 524) that has the highest value, and one of the coefficients 503 (i.e., coefficients governing the operation of equalizer circuit 525) that has the highest value. The value of the main tap from coefficients 502 is provided as a coefficient value 610 and the value of the main tap from coefficients 503 is provided as a coefficient value 612. Both coefficient value 610 and coefficient value 612 are provided to a scalar1 calculation circuit 615. Scalar1 calculation circuit 615 calculates first scalar 564 in accordance with the following equation:

$$\text{First Scalar 564} = \text{round}\left[\frac{(16 * \text{Coefficient Value 610})}{(\text{Coefficient Value 610} + \text{Coefficient Value 612})}\right],$$

were the "round" function rounds the value to the nearest integer. First scalar 564 is provided to a scalar2 calculation circuit 620 that calculates second scalar 565 in accordance with the following equation:

Second Scalar 565=16−First Scalar 564.

Turning to FIG. 7, another scalar calculation circuit 700 that may be used in relation to the processing circuit 500 is shown in accordance with other embodiments. As shown, scalar calculation circuit 700 includes a mean squared error calculation circuit 705 that receives equalized output 532 and processing data output 578, and calculates a mean squared error of equalized output 532 compared with processing data output 578 (i.e., the combination of equalized output 532 and equalized output 533). The resulting mean squared error value is inverted (i.e., 1/MSE) with the result being provided as an MSE value 710. Additionally, scalar calculation circuit 700 includes a mean squared error calculation circuit 735 that receives equalized output 533 and processing data output 578, and calculates a mean squared error of equalized output 533 compared with processing data output 578 (i.e., the combination of equalized output 532 and equalized output 533). The resulting mean squared error value is inverted (i.e., 1/MSE) with the result being provided as an MSE value 740. A mean squared error summing circuit 745 adds MSE value 710 and MSE value 740 to yield a sum of the mean squared error values (i.e., MSE value 710+MSE value 740) which is provided as a summed MSE output 750.

Both MSE value 710 and summed MSE output 750 are provided to a scalar1 calculation circuit 755. Scalar1 calculation circuit 755 calculates first scalar 564 in accordance with the following equation:

$$\text{First Scalar 564} = \text{round}\left[\frac{(16 * \text{MSE Value 710})}{\text{Summed MSE Value 750}}\right],$$

were the "round" function rounds the value to the nearest integer. First scalar 564 is provided to a scalar2 calculation circuit 760 that calculates second scalar 565 in accordance with the following equation:

Second Scalar 565=16−First Scalar 564.

Turning to FIG. 8, yet another scalar calculation circuit 800 that may be used in relation to the processing circuit 500 is shown in accordance with other embodiments. As shown, scalar calculation circuit 800 includes a sine mask circuit 805 that receives coefficients 502 (i.e., coefficients governing the operation of equalizer circuit 524 [$f0_0, f0_1, \ldots, f0_N$]) and masks them with a sine mask [0 1 0 −1 0 1 0 −1 . . . ] to yield a sine output 810 (i.e., [$f0_1 - f0_3 + f0_5 - f0_7 + \ldots$]). A cosine mask circuit 815 that receives coefficients 502 [$f0_0, f0_1, \ldots, f0_N$] and masks them with a cosine mask [01 0 −1 0 1 0 −1 0 . . . ] to yield a cosine output 820 (i.e., [$f0_0 - f0_2 + f0_4 - f0_6 + \ldots$]). Sine output 810 and cosine output 820 are provided to a magnitude calculation circuit 830 that calculates a magnitude 835 in accordance with the following equation:

Magnitude 835=(sine output 810)$^2$+(cosine output 820)$^2$.

Additionally, scalar calculation circuit 800 includes a sine mask circuit 875 that receives coefficients 503 (i.e., coefficients governing the operation of equalizer circuit 525 [$f1_0, f1_1, \ldots, f1_N$]) and masks them with a sine mask [0 1 0 −1 0 1 0 −1 . . . ] to yield a sine output 880 (i.e., [$f1_1 - f1_3 + f1_5 - f1_7 + \ldots$]). A cosine mask circuit 885 that receives coefficients 503 [$f1_0, f1_1, \ldots, f1_N$] and masks them with a cosine mask [01 0 −1 0 1 0 −1 0 . . . ] to yield a cosine output 890 (i.e., [$f1_0 - f1_2 + f1_4 - f1_6 + \ldots$]). Sine output 880 and cosine output 890 are provided to a magnitude calculation circuit 895 that calculates a magnitude 897 in accordance with the following equation:

Magnitude 897=(sine output 880)$^2$+(cosine output 890)$^2$.

Magnitude 835 and magnitude 897 are provided to a scalar1 calculation circuit 855. Scalar1 calculation circuit 855 calculates first scalar 564 in accordance with the following equation:

$$\text{First Scalar 564} = \text{round}\left[\frac{(16 * \text{Magnitude 835})}{\text{Magnitude 835} + \text{Magnitude 897}}\right],$$

were the "round" function rounds the value to the nearest integer. First scalar 564 is provided to a scalar2 calculation circuit 960 that calculates second scalar 565 in accordance with the following equation:

Second Scalar 565=16−First Scalar 564.

Turning to FIG. 9, yet another scalar calculation circuit 900 that may be used in relation to the processing circuit 500 is shown in accordance with other embodiments. As shown, scalar calculation circuit 900 includes a fast Fourier transform (FFT) circuit 905 that applies a fast Fourier transform to coefficients 502 to calculate the fast Fourier transform values at frequency/4 and frequency/8 that are provided as frequency values 910 to an element summation circuit 930. The aforementioned "frequency" is the data rate at which the system is operating. Element summation circuit 930 sums the received values to yield an FFT value 935 for coefficients 502. In parallel, a fast Fourier transform (FFT) circuit 915 that applies a fast Fourier transform to coefficients 503 to calculate the fast Fourier transform values at frequency/4 and frequency/8 that are provided as frequency values 920 to an element summation circuit 970. Notably, other embodiments may calculate several FFT values corresponding to frequencies between frequency/4 and frequency/8 to get a more accurate representation of the frequency response in the area of interest. Element summation circuit 970 sums the received values to yield an FFT value 975 for coefficients 503.

FFT value 935 and FFT value 975 are provided to a scalar1 calculation circuit 955. Scalar1 calculation circuit 955 calculates first scalar 564 in accordance with the following equation:

$$\text{First Scalar 564} = \text{round}\left[\frac{(16 * FTT \text{ Value 935})}{FTT \text{ Value 935} + FFT \text{ Value 975}}\right],$$

were the "round" function rounds the value to the nearest integer. First scalar 564 is provided to a scalar2 calculation circuit 860 that calculates second scalar 565 in accordance with the following equation:

Second Scalar 565=16−First Scalar 564.

Offset estimation circuit 330 uses both processed signal 312 and processed signal 322 to determine whether one of the sources from which inputs 308, 318 are derived is receiving a noisier signal than the other. Where input 308 is a noisier signal that input 318, offset estimation circuit 330 will generate a head offset signal 333 indicating a lateral skew (i.e., a change in lateral distances 222, 224) causing the noise difference and a quality signal 332 favoring input 318 over input 308. In contrast, where input 318 is a noisier signal that input 308, offset estimation circuit 330 will generate head offset signal 333 indicating the lateral skew causing the noise difference and quality signal 332 favoring input 308 over input 318. In addition, offset estimation circuit 330 generates an inline offset signal 334 (i.e., a signal corresponding to inline distance 226).

An example implementation of the combination of analog processing path circuit 310, analog processing path circuit 320 and offset estimation circuit 330 is shown in accordance with some embodiments of the present invention is shown in FIG. 4a. Turning to FIG. 4a, an implementation 400 includes a dual path analog processing circuit 497 and an offset estimation circuit 496. When implementation 400 is used in relation to processing circuit 300, an input 401 is connected to input 308, an input 411 is connected to input 318, a head offset output 428 is connected to head offset signal 333, a quality metric is connected to quality signal 332, and one of a time shift 434 or a phase shift 433 is connected to inline offset signal 334.

Dual path analog processing circuit 497 includes a preamplifier 402 that amplifies input 401 to yield an amplified signal 403. Amplified signal 403 is provided to an analog front end circuit 404 that processes amplified signal 403 to yield a processed signal 405. Processed signal 405 corresponds to processed signal 312 of FIG. 3. Analog front end circuit 404 may include, but is not limited to, an analog filtering circuit (not shown). In addition, dual path analog processing circuit 497 includes a preamplifier 412 that amplifies input 411 to yield an amplified signal 413. Amplified signal 413 is provided to an analog front end circuit 414 that processes amplified signal 413 to yield a processed signal 415. Processed signal 415 corresponds to processed signal 322 of FIG. 3. Analog front end circuit 414 may include, but is not limited to, an analog filtering circuit (not shown).

Offset estimation circuit 496 includes a sync detector circuit 406 that applies a sync detection algorithm to processed signal 405, where the sync detection algorithm is dynamically selected for the particular region of a storage medium from which inputs 401, 411 are being received. For example, where inputs 401, 411 are being read from a track of a storage medium using a preamble A (see FIG. 2b above), then sync detector circuit 406 is dynamically tuned to look for preamble A. On the other hand, where inputs 401, 411 are being read from a track of a storage medium using a preamble B (see FIG. 2b above), then sync detector circuit 406 is dynamically tuned to look for preamble B. Using a specific example where preamble A is a 2T preamble and preamble B is a 3T preamble, where inputs 401, 411 are being read from a track of a storage medium using a 2T pattern, then sync detector circuit 406 is dynamically tuned to look for 2T pattern. In contrast, where inputs 401, 411 are being read from a track of a storage medium using a 3T pattern, then sync detector circuit 406 is dynamically tuned to look for 3T pattern. In addition, offset estimation circuit 496 includes a sync detector circuit 416 that looks for a defined preamble pattern in processed signal 415. Sync detector circuit 416 is the same as sync detector circuit 406, and is dynamically tuned to detect the same preamble as sync detector circuit 406. When sync detector circuit 406 identifies the preamble pattern corresponding to the particular region from which input 401 is being derived in processed signal 405, it provides a time stamp 407 indicating a time at which the pattern was detected. Similarly, when sync detector circuit 416 identifies the same pattern queried by sync detector circuit 406 in processed signal 415, it provides a time stamp 417 indicating a time at which the pattern was detected.

Offset estimation circuit 496 also includes a preamble energy estimator circuit 408 that is operable to estimate the overall energy in processed signal 405, and to estimate the portion of the overall energy corresponding to the preamble A and the portion of the overall energy corresponding to the preamble B. Where, for example, preamble A is a 2T pattern and preamble B is a 3T pattern, the resolution for the energy computations will be 12T, where T indicates a period. The energy computations may be done using any energy computation approach known in the art. The computed overall energy is provided as an overall energy output 422 to a quality and off-track synthesizer circuit 420, the energy from preamble A is provided as an preamble A energy output 424 to quality and off-track synthesizer circuit 420, and the energy from preamble B is provided as an preamble B energy output 426 to quality and off-track synthesizer circuit 420. In addition, preamble energy estimator circuit 408 provides a phase output 409 that indicates a phase where overall energy 422 is a maximum.

Similar to preamble energy estimator circuit 408, a preamble energy estimator circuit 418 is operable to estimate the overall energy in processed signal 415, and to estimate the portion of the overall energy corresponding to the preamble A and the portion of the overall energy corresponding to the preamble B. The computed overall energy is provided as an overall energy output 421 to a quality and off-track synthesizer circuit 420, the energy from preamble A is provided as an preamble A energy output 423 to quality and off-track synthesizer circuit 420, and the energy from preamble B is provided as an preamble B energy output 425 to quality and off-track synthesizer circuit 420. In addition, preamble energy estimator circuit 418 provides a phase output 419 that indicates a phase where overall energy 421 is a maximum.

Quality and off-track synthesizer circuit 420 calculates a signal to noise ratio for each of processed signal 405 and processed signal 415. In particular, where the expected preamble is preamble A, quality and off-track synthesizer circuit 420 calculates the signal to noise ratios in accordance with the following equations:

$$\text{Preamble } ASNR \text{ of Input } 401 = \frac{\text{Preamble Energy } A424}{\text{Overall Energy } 422}; \text{ and}$$

$$\text{Preamble } ASNR \text{ of Input } 411 = \frac{\text{Preamble Energy } A423}{\text{Overall Energy } 421}.$$

In contrast, where the expected preamble is preamble B, quality and off-track synthesizer circuit 420 calculates the signal to noise ratios in accordance with the following equations:

$$\text{Preamble } BSNR \text{ of Input } 401 = \frac{\text{Preamble Energy } A426}{\text{Overall Energy } 422}; \text{ and}$$

$$\text{Preamble } BSNR \text{ of Input } 411 = \frac{\text{Preamble Energy } A425}{\text{Overall Energy } 421}.$$

It should be noted that in some cases, it is not necessary to know beforehand whether the region being accessed has a preamble A or a preamble B as quality and off-track synthesizer circuit 420 may simply calculate the signal to noise ratio for both preambles, and the preamble that yields the highest signal to noise ratio is selected as the actual preamble for the region. The ratio of the signal to noise ratio for the actual preamble to the signal to signal noise ratio for the adjacent preamble corresponds to how much percentage the head from which the signal is derived is off track. Thus, where for example the actual preamble is preamble A and the adjacent preamble is preamble B, a head offset for the two paths may be calculated in accordance with the following equations:

$$\text{Offset of Input } 401 = \frac{\text{Preamble } ASNR \text{ of Input } 401}{\text{Preamble } BSNR \text{ of Input } 401}; \text{ and}$$

$$\text{Offset of Input } 411 = \frac{\text{Preamble } ASNR \text{ of Input } 411}{\text{Preamble } BSNR \text{ of Input } 411}.$$

Because the two heads (i.e., the head from which input 401 is derived and the head from which input 411 is derived) move laterally together, the aforementioned offset values move together. In particular, as the head from which input 401 is derived moves toward the adjacent preamble (in this example preamble B), the value of the offset for input 401 will decrease. As this happens, the head from which input 411 is derived moves more toward the center of the region of preamble A and exhibits less interference from preamble B. As such, the value of the offset for input 411 will increase. The reverse is true where the head from which input 411 is derived moves toward the adjacent preamble (in this example preamble B), the value of the offset for input 411 will decrease. As this happens, the head from which input 401 is derived moves more toward the center of the region of preamble A and exhibits less interference from preamble B. As such, the value of the offset for input 401 will increase. Head offset estimate 428 is a composite of the offset for input 401 and the offset for input 411. In addition to other uses discussed herein, this head offset information may be used to adjust the head locations.

Quality and off-track synthesizer circuit 420 determines quality metric 427 based upon a comparison of the signal to noise ratio for one preamble for input 401 and the signal to noise ratio for the other preamble for input 411. As an example, where the actual preamble is a 2T preamble and the adjacent preamble is a 3T preamble, quality metric 427 is determined by comparing the signal to noise ratio of input 401 for the 2T preamble with the signal to noise ratio of input 411 for the 3T path. The larger of the aforementioned signal to noise ratios indicates a better signal quality, and the data from the input with the higher signal to noise ratio is indicated by quality metric 427 and used as the main signal path for loop adaptation.

Phase output 409, phase output 419, time stamp 407, and time stamp 417 are provided to a head offset estimation circuit 430. Head offset estimation circuit 430 provides indicators corresponding to the inline separation between the head from which input 401 is derived and the head from which input 411 is derived (e.g., inline distance 226). In particular, head offset estimation circuit 430 calculates time shift 434 and phase shift 433 in accordance with the following equations:

Time Shift 434=Time Stamp 407−Time Stamp 417; and

Phase Shift 434=Phase Stamp 409−Phase Stamp 419.

Returning to FIG. 3, quality signal 332, head offset signal 333, and inline offset signal 334 are provided to a dual source ADC and equalizer circuit 336 where they are used in applying analog to digital conversion and equalization to processing signal 312 and processing signal 322 to yield unified processing output 338. An example implementation of a dual source ADC and equalizer circuit 336 is shown in accordance with some embodiments of the present invention is shown in FIG. 4b. Turning to FIG. 4b, an implementation 498 is shown. Where implementation 498 is used in place of dual source ADC and equalizer circuit 336, an input 405 is connected to processed signal 312, an input 415 is connected to processed signal 322, and an equalized data 471 is connected to unified processing output 338. Implementation 498 includes an analog to digital converter circuit 440 that converts input 405 into a series of digital samples 441 synchronous to a sampling clock corrected by a loop sample adjustment 486, and an analog to digital converter circuit 450 that converts input 415 into a series of digital samples 451 synchronous to the sampling clock. Analog to digital converter circuits 440, 450 may be any circuits known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

A FIFO based alignment circuit 442 aligns digital samples 441 with digital samples 451 using time shift 434 to yield aligned samples 443. This alignment compensates for the fact that the head from which input 405 is derived leads the head from which input 415 is derived by a fixed distance (e.g., inline distance 226) represented by time shift 434. In other cases, phase shift 433 may be used to govern the alignment process. FIFO based alignment circuit 442 may be any circuit known in the art that is capable of time shifting samples based upon an offset input.

Aligned samples 443 are provided to an equalizer circuit 444 that applies an equalization algorithm governed by coefficients 495 to yield an equalized output 445. Similarly, digital samples 451 are provided to an equalizer circuit 454 that applies an equalization algorithm governed by coefficients 496 to yield an equalized output 455. In some embodiments of the present invention, equalizer circuits 444, 454 are digital finite impulse response filter circuits as are known in the art. Equalized output 445 is provided to a multiplier circuit 446 where it is multiplied by quality metric 427 to yield a product 447, and equalized output 455 is provided to a multiplier circuit 456 where it is multiplied by quality metric 427 to yield a product 457. As one example, where the head from which input 405 is derived is substantially off-track as determined by quality and off-track synthesizer circuit 420, the value of quality metric 427 provided to multiplier circuit 446 is zero and the value of quality metric 427 provided to multiplier circuit 456 is one. Alternatively, where the head from which input 415 is derived is substantially off-track as determined by quality and off-track synthesizer circuit 420, the value of quality metric 427 provided to multiplier circuit 446 is one and the value of quality metric 427 provided to multiplier circuit 456 is zero. Where one head or the other is only slightly off-track determined by quality and off-track synthesizer circuit 420 a weighted balance is applied with, for example, the value being provided to the multiplier circuit corresponding to the head that is slightly off-track receiving a value of 0.3 for quality metric 427, and the other multiplier circuit receiving the residual value of 0.7. Where the signal to noise ratios of both of the heads are similar, of value of 0.5 for the quality metric is provided to each of multiplier circuit 446 and multiplier circuit 456. Products 447, 457 are each provided to a summation circuit 449 where they are added to yield equalized data 471. This addition yields a weighted average between equalized output 445 and equalized output 455 with the weighting in the average derived from the values of quality metric 427.

Where one head or the other is off-track, coefficients 495, 496 used by equalizer circuit 444 and equalizer circuit 454 may need additional adjustment to compensate. To provide such compensation, pre-calculated initial coefficients may be used. In one particular case, a zero percent off-track coefficient set 462, 463; a five percent off-track coefficient set 464, 465; a ten percent off-track coefficient set 466, 467; and a fifteen percent off-track coefficient set 468, 469 may be available and provided to respective initial coefficient selection circuits 460, 461 from a coefficient memory 470. Based upon head offset estimate 428, the coefficient set corresponding to the head offset may be selected and provided as coefficients 495 and coefficients 496. For example, where head offset estimate 428 indicates that neither head is experiencing significant interference from an adjacent preamble pattern, coefficients 495 are selected to be zero percent off-track coefficient set 462 and coefficients 496 are selected to be zero percent off-track coefficient set 463. As another example, where head offset estimate 428 indicates that the head from which input 405 is derived is ten percent off track and the head from which input 415 is derived is on track, coefficients 495 are selected to be ten percent off-track coefficient set 466 and coefficients 496 are selected to be zero percent off-track coefficient set 463. As yet another example, where head offset estimate 428 indicates that the head from which input 415 is derived is five percent off track and the head from which input 405 is derived is on track, coefficients 495 are selected to be zero percent off-track coefficient set 462 and coefficients 496 are selected to be five percent off-track coefficient set 465. It should be noted that initial coefficient selection circuits 460, 461 may be augmented to allow for interpolation between coefficient sets to allow for finer resolution. For example, where head offset estimate 428 indicates that the head from which input 405 is derived is eight percent off-track, an interpolation between five percent off-track coefficient set 464 and ten percent off-track coefficient set 466 may be performed to yield coefficients 495. Allowing for pre-calculated coefficients tailored for different off-track conditions provides for faster equalization convergence.

Referring again to FIG. 3, unified processing output 338 is stored to a sample buffer circuit 375 that includes sufficient memory to maintain one or more codewords until processing of that codeword is completed through a data detector circuit 325 and a data decoder circuit 350 including, where warranted, multiple "global iterations" defined as passes through both data detector circuit 325 and data decoder circuit 350 and/or "local iterations" defined as passes through data decoding circuit 350 during a given global iteration. Sample buffer circuit 375 stores the received data as buffered data 377.

Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Based upon the disclosure provided herein, one of ordinary skill in the art will recognize a variety of data detector circuits that may be used in relation to different embodiments of the present invention. Detected output 325 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. Data decoder circuit 350 may be, for example, a low density parity check decoder circuit. Based upon the disclosure provided herein, one of ordinary skill in the art will recognize a variety of data decoder circuits that may be used in relation to different embodiments of the present invention.

The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and data decoder circuit 350 may be made in an effort to converge on the originally written data set. Processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

In addition, a loop circuit 305 is used to, among other things, modify the sampling clock for the analog to digital converter circuits of dual source ADC and equalizer circuit 336. Loop circuit 305 includes a slope determination circuit 388 operable to determine a slope of digital samples 386 derived from input 318 to yield a slope 392, and a slope determination circuit 387 operable to determine a slope of digital samples 385 derived from input 308. Where, for example, implementation 498 of dual source ADC and equalizer circuit 336 is used, digital samples 385 correspond to digital samples 441 and digital samples 386 correspond to digital samples 451 to yield a slope 391. Slope determination circuits 387, 388 may be any circuit known in the art for determining slope based upon an input data set. In addition, loop circuit 305 includes a loop error circuit 390 operable to determine a loop error from digital samples 386 derived from input 318 to yield a loop feedback 395, and a loop error circuit 389 operable to determine a loop error from digital samples 385 derived from input 308 to yield a loop feedback 393. Loop error circuits 389, 390 may be any circuit known in the art for determining a loop error based upon an input data set.

Slope 391, slope 392, digital samples 385, digital samples 386, loop feedback 393 and loop feedback 395 are provided to a combined error calculation circuit 397 that is operable to calculate an error feedback value 302 by combining information from input 308 and input 318. An example implementation of combined error calculation circuit 397 is shown in accordance with some embodiments of the present invention is shown in FIG. 4c. Turning to FIG. 4c, an implementation 499 is shown. Where implementation 499 is used in place of combined error calculation circuit 397, input 441 is connected to digital samples 385, input 451 is connected to digital samples 386, an input 473 is connected to loop feedback 393, an input 475 is connected to loop feedback 395, an input 476 is connected to slope 391, an input 478 is connected to slope 392, and loop sample adjust 486 is connected to error feedback value 302. Input 441 and input 473 are added by a summation circuit 472 to yield a result 481, and result 481 is multiplied by input 476 by a multiplier circuit 477 to yield a product 483. Input 451 and input 475 are added by a summation circuit 474 to yield a result 421, and result 482 is multiplied by input 478 by a multiplier circuit 479 to yield a product 484. An error combiner circuit 485 combines product 483 with product 484 in a proportion controlled by quality metric 427 to yield loop sample adjust 486. The combining of product 483 and product 484 to yield loop sample adjust 486 may be done similar to that discussed above in relation to FIG. 4b where equalized output 445 and equalized output 445 are combined in a proportion dictated by quality metric 427.

Turning to FIG. 5, a flow diagram 500 shows a method for balanced processing of multiple streams of data derived from the same track of a storage medium in accordance with one or more embodiments of the present invention. Following flow diagram 500, data is received from two different read head (blocks 504, 505). Analog processing is applied to the data from each of the respective read heads to yield respective processed outputs (blocks 509, 510). Sync detection is performed on each of the processed outputs, and when a sync mark is found, a time stamp indicating the sync location is provided (blocks 514, 513). In addition, the energy of the actual preamble and the adjacent preamble is calculated (blocks 512, 515). Using the estimated energies and the time stamps of the sync marks, a quality metric, a head offset and a time shift are calculated (block 520). These calculations/determinations may be done similar to that set forth above in relation to FIGS. 3 and 4a.

Dual source analog to digital conversion and equalization is performed to yield an equalized output (block 525). This processing relies on the quality metric and the head offset as discussed above in relation to FIGS. 3 and 4b. Dual source loop based sampling adjustment is performed to modify the sampling clock used during the analog to digital conversion (block 530). This process may be performed similar to that discussed above in relation to FIGS. 3 and 4c. In addition, a data processing algorithm is applied to the equalized output to yield a data output (block 535). This data processing may be performed similar to that discussed above in relation to FIG. 3.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, functions of the systems or functions of the circuits discussed herein may be implemented in either software or firmware. In some such cases, the entire system, block or circuit may be implemented using its software or firmware equivalent, albeit such a software or firmware system would not be a circuit. In other cases, the one function of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a first equalizer circuit operable to equalize a first data input to yield a first equalized output;
   a first interpolator circuit operable to interpolate a delayed instance of the first data input to yield a first interpolated output;
   a second equalizer circuit operable to equalize a second data input to yield a second equalized output;
   a second interpolated circuit operable to interpolate a delayed instance of the second data input to yield a second interpolated output;
   a first summation circuit operable to sum the first equalized output and the second equalized output to yield a first combined output;
   a data detector circuit operable to apply a data detection algorithm to the first combined output to yield a detected output;
   a first loop pulse estimator circuit operable to estimate a first pulse output from the detected output;
   a second loop pulse estimator circuit operable to estimate a second pulse output from the detected output;
   a first multiplier operable to multiply a first interim feedback by a first scalar value to yield a first scaled output, wherein the first interim feedback is derived from the first pulse output;
   a second multiplier operable to multiply a second interim feedback by a second scalar value to yield a second scaled output, wherein the second interim feedback is derived from the second pulse output; and
   a second summation circuit operable to sum a third interim feedback with a fourth interim feedback to yield a second combined output, wherein the third interim feedback is derived from the first interim feedback and the fourth interim feedback is derived from the second interim feedback.

2. The system of claim 1, the system further comprising:
   a first slope circuit operable to calculate a first slope based upon the first pulse output, wherein the first interim feedback is the first slope; and
   a second slope circuit operable to calculate a second slope based upon the second pulse output, wherein the second interim feedback is the second slope.

3. The system of claim 1, wherein the first interim feedback is the first pulse output, and the second interim feedback is the second pulse output.

4. The system of claim 3, the system further comprising:
   a first slope circuit operable to calculate a first slope based upon the first scaled output, wherein the third interim feedback is the first slope; and
   a second slope circuit operable to calculate a second slope based upon the second scaled output, wherein the fourth interim feedback is the second slope.

5. The system of claim 1, wherein the third interim feedback is the first scaled output, and the fourth interim feedback is the second scaled output.

6. The system of claim 1, wherein the system is implemented as part of a storage device, the storage device comprising:
   a storage medium;
   a head disposed in relation to the storage medium, wherein the head includes at least a first read sensor and a second read sensor;
   a first analog to digital converter circuit operable to convert a first analog input derived from the first read sensor to yield a first series of digital samples based upon a feedback value, wherein the feedback value is generated based upon the second combined output, and wherein the first data input is derived from the first series of digital samples; and
   a second analog to digital converter circuit operable to convert a second analog input derived from the second read sensor to yield a second series of digital samples based upon the feedback value, and wherein the second data input is derived from the second series of digital samples.

7. The system of claim 1, wherein the system is implemented as part of an integrated circuit.

8. The system of claim 1, wherein operation of the first equalizer circuit is governed in part based upon a first coefficient, wherein the second equalizer circuit is governed in part based upon a second coefficient, the system further comprising:
   a scalar calculation circuit operable to:
      calculate the first scalar based upon the first coefficient and the second coefficient; and
      calculate the second scalar based upon the first scalar.

9. The system of claim 1, the system further comprising:
   a scalar calculation circuit operable to:
      calculate a mean squared error of the first equalized output to yield a first error;
      calculate a mean squared error of the second equalized output to yield a second error;
      calculate the first scalar based upon the first error and the second error; and
      calculate the second scalar based upon the first scalar.

10. The system of claim 1, wherein operation of the first equalizer circuit is governed in part based upon a first coefficient, wherein the second equalizer circuit is governed in part based upon a second coefficient, the system further comprising:
    a scalar calculation circuit operable to:
       calculate a first fast Fourier transform value based at least in part on the first coefficient;
       calculate a second fast Fourier transform value based at least in part on the second coefficient;
       calculate the first scalar based upon a combination of the first fast Fourier transform value and the second first fast Fourier transform value.

11. The system of claim 1, wherein operation of the first equalizer circuit is governed in part based upon a first coefficient and a second coefficient, wherein the second equalizer circuit is governed in part based upon a third coefficient and a fourth coefficient, the system further comprising:

a scalar calculation circuit operable to:
  calculate a first sine value based at least in part on the first coefficient;
  calculate a first cosine value based at least in part on the second coefficient;
  calculate a second sine value based at least in part on the third coefficient;
  calculate a second cosine value based at least in part on the fourth coefficient;
  calculate a first magnitude value based on the first sine value and a first cosine value;
  calculate a second magnitude value based on the second sine value and a second cosine value; and
  calculate the first scalar based upon a combination of the first magnitude value and the second magnitude value.

12. A data processing system, the system comprising:
  a first equalizer circuit operable to equalize a first data input to yield a first equalized output based upon at least in part on a first coefficient;
  a second equalizer circuit operable to equalize a second data input to yield a second equalized output based upon at least in part on a second coefficient;
  a summation circuit operable to sum the first equalized output with the second equalized output to yield a composite output;
  a first multiplication circuit operable to multiply an first input by a first scalar value to yield a first product, wherein the first input is derived from a combination of the composite output and the first data input;
  a second multiplication circuit operable to multiply a second input by a second scalar value to yield a second product, wherein the second input is derived from a combination of the composite output and the second data input; and
  a scalar calculation circuit operable to calculate the first scalar based upon the first coefficient and the second coefficient.

13. The system of claim 12, wherein the scalar calculation circuit is further operable to calculate the second scalar based upon the first scalar.

14. The system of claim 12, wherein the system is implemented as part of an integrated circuit.

15. The system of claim 12, wherein the system is implemented as part of a storage device, the storage device comprising:
  a storage medium;
  a head disposed in relation to the storage medium, wherein the head includes at least a first read sensor and a second read sensor;
  a first analog to digital converter circuit operable to convert a first analog input derived from the first read sensor to yield a first series of digital samples based upon a feedback value, wherein the feedback value is generated based upon a combination of the first product and the second product, wherein the first data input is derived from the first series of digital samples; and
  a second analog to digital converter circuit operable to convert a second analog input derived from the second read sensor to yield a second series of digital samples based upon the feedback value, and wherein the second data input is derived from the second series of digital samples.

16. The system of claim 12, wherein the scalar calculation circuit is operable to:
  calculate a first fast Fourier transform value based at least in part on the first coefficient;
  calculate a second fast Fourier transform value based at least in part on the second coefficient;
  calculate the first scalar based upon a combination of the first fast Fourier transform value and the second first fast Fourier transform value.

17. The system of claim 12, wherein operation of the first equalizer circuit is governed in part based upon the first coefficient and a third coefficient, and the second equalizer circuit is governed in part based upon the second coefficient and a fourth coefficient, and wherein the scalar calculation circuit is operable to:
  calculate a first sine value based at least in part on the first coefficient;
  calculate a first cosine value based at least in part on the third coefficient;
  calculate a second sine value based at least in part on the second coefficient;
  calculate a second cosine value based at least in part on the fourth coefficient;
  calculate a first magnitude value based on the first sine value and a first cosine value;
  calculate a second magnitude value based on the second sine value and a second cosine value; and
  calculate the first scalar based upon a combination of the first magnitude value and the second magnitude value.

18. A data processing system, the system comprising:
  a first equalizer circuit operable to equalize a first data input to yield a first equalized output;
  a second equalizer circuit operable to equalize a second data input to yield a second equalized output;
  a summation circuit operable to sum the first equalized output with the second equalized output to yield a composite output;
  a first multiplication circuit operable to multiply an first input by a first scalar value to yield a first product, wherein the first input is derived from a combination of the composite output and the first data input;
  a second multiplication circuit operable to multiply a second input by a second scalar value to yield a second product, wherein the second input is derived from a combination of the composite output and the second data input; and
  a scalar calculation circuit operable to:
    calculate a mean squared error of the first equalized output to yield a first error;
    calculate a mean squared error of the second equalized output to yield a second error; and
    calculate the first scalar based upon the first error and the second error.

19. The system of claim 18, wherein the scalar calculation circuit is further operable to calculate the second scalar based upon the first scalar.

20. The system of claim 18, wherein the system is implemented as part of a storage device, the storage device comprising:
  a storage medium;
  a head disposed in relation to the storage medium, wherein the head includes at least a first read sensor and a second read sensor;
  a first analog to digital converter circuit operable to convert a first analog input derived from the first read sensor to yield a first series of digital samples based upon a feedback value, wherein the feedback value is generated based upon a combination of the first product and the second product, wherein the first data input is derived from the first series of digital samples; and a second analog to digital converter circuit operable to convert a second analog input derived from the second read sensor to yield a second series of digital samples based upon the feedback value, and wherein the second data input is derived from the second series of digital samples.

* * * * *